(12) United States Patent
Chen et al.

(10) Patent No.: US 12,666,341 B2
(45) Date of Patent: Jun. 23, 2026

(54) ACCESS BARRING FOR RADIO ACCESS NETWORK SLICING

(71) Applicant: Apple Inc., Cupertino, CA (US)

(72) Inventors: Yuqin Chen, Beijing (CN); Birgit Breining, Munich (DE); Dawei Zhang, Saratoga, CA (US); Fangli Xu, Beijing (CN); Haijing Hu, Los Gatos, CA (US); Longda Xing, San Jose, CA (US); Rama Diwakara Rao Noolu, Fremont, CA (US); Sethuraman Gurumoorthy, San Ramon, CA (US); Srirang A. Lovlekar, Fremont, CA (US); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 879 days.

(21) Appl. No.: 17/593,457

(22) PCT Filed: Aug. 5, 2020

(86) PCT No.: PCT/CN2020/107197
§ 371 (c)(1),
(2) Date: Sep. 19, 2021

(87) PCT Pub. No.: WO2022/027355
PCT Pub. Date: Feb. 10, 2022

(65) Prior Publication Data
US 2022/0303871 A1    Sep. 22, 2022

(51) Int. Cl.
*H04W 48/02*    (2009.01)
*H04W 74/0833*    (2024.01)

(52) U.S. Cl.
CPC ....... *H04W 48/02* (2013.01); *H04W 74/0833* (2013.01)

(58) Field of Classification Search
None
See application file for complete search history.

(56) References Cited

U.S. PATENT DOCUMENTS

| | | | | |
|---|---|---|---|---|
| 2017/0367120 A1* | 12/2017 | Murray | ............... | H04B 7/0695 |
| 2018/0317264 A1 | 11/2018 | Agiwal et al. | | |
| 2019/0281494 A1 | 9/2019 | Chan et al. | | |

FOREIGN PATENT DOCUMENTS

| | | |
|---|---|---|
| CN | 106572516 | 4/2017 |
| CN | 110383942 | 10/2019 |
| CN | 110870354 | 3/2020 |

(Continued)

OTHER PUBLICATIONS

Nokia et al., "RACH isolation for Slices", 3GPP TSG-RAN WG2 Meeting #95bis, R2-166172, Sep. 20, 2016, 3 sheets.

(Continued)

*Primary Examiner* — Adolf Dsouza
(74) *Attorney, Agent, or Firm* — Fay Kaplun & Marcin, LLP

(57) ABSTRACT

A user equipment (UE) may be barred from accessing one or more network slices. The UE collects information to perform an access barring procedure corresponding to a cell of a network, performs an accessing barring procedure using the information, performs a random access channel (RACH) procedure with the cell and establishes a radio resource control (RRC) connection with the cell.

18 Claims, 5 Drawing Sheets

Method 300

Start

305 — Collect information to perform an access barring check for a cell

310 — Perform the access barring check

315 — Perform RACH procedure

320 — Attempt to establish an RRC connection

325 — Establish RRC connection

330 — Transition from RRC connected state to RRC idle state or RRC inactive state End

(56) References Cited

FOREIGN PATENT DOCUMENTS

| EP | 3474603 | 4/2019 |
| WO | 2018143631 | 8/2018 |
| WO | 2019/030429 | 2/2019 |
| WO | 2019139315 | 7/2019 |
| WO | 2019/194597 | 10/2019 |

OTHER PUBLICATIONS

Huawei et al., "Slice-based Unified Access Control", 3GPP TSG-RAN2 Meeting #101bis, R2-1804617, Apr. 29, 2018, 5 sheets.

* cited by examiner

UE 110

Method 300

Start

305　Collect information to perform an access barring check for a cell

310　Perform the access barring check

315　Perform RACH procedure

320　Attempt to establish an RRC connection

325　Establish RRC connection

330　Transition from RRC connected state to RRC idle state or RRC inactive state

End

| Access Category number | Conditions related to UE | Type of access attempt |
|---|---|---|
| 0 | All | MO signalling resulting from paging |
| 1 (NOTE 1) | UE is configured for delay tolerant service and subject to access control for Access Category 1, which is judged based on relation of UE's HPLMN and the selected PLMN. | All except for Emergency |
| 2 | All | Emergency |
| 3 | All except for the conditions in Access Category 1. | MO signalling on NAS level resulting from other than paging |
| 4 | All except for the conditions in Access Category 1. | MMTEL voice (NOTE 3) |
| 5 | All except for the conditions in Access Category 1. | MMTEL video |
| 6 | All except for the conditions in Access Category 1. | SMS |
| 7 | All except for the conditions in Access Category 1. | MO data that do not belong to any other Access Categories (NOTE 4) |
| 8 | All except for the conditions in Access Category 1. | MO signalling on RRC level resulting from other than paging |
| 9-31 | All | Reserved standardized Access Categories |
| 32-63 (NOTE 2) | | Based on operator classification |

Fig. 4

| Access Identity number | UE configuration |
|---|---|
| 0 | UE is not configured with any parameters from this table |
| 1 (NOTE 1) | UE is configured for multimedia priority service (MPS). |
| 2 (NOTE 2) | UE is configured for mission critical service (MCS). |
| 3-10 | Reserved for future use |
| 11 (NOTE 3) | Access Class 11 is configured in the UE. |
| 12 (NOTE 3) | Access Class 12 is configured in the UE. |
| 13 (NOTE 3) | Access Class 13 is configured in the UE. |
| 14 (NOTE 3) | Access Class 14 is configured in the UE. |
| 15 (NOTE 3) | Access Class 15 is configured in the UE. |

Fig. 5

ACCESS BARRING FOR RADIO ACCESS NETWORK SLICING

BACKGROUND

A user equipment (UE) may connect to a network that includes multiple network slices. Generally, a network slice refers to an end-to-end logical network that is configured to provide a particular service and/or possess particular network characteristics. Each network slice may be isolated from one another but run on a shared physical network infrastructure. Thus, each network slice may share network resources but facilitate different functionality.

The UE may camp on a cell of the network to access a network slice. To avoid congestion and strain on the resources of the cell resources, there is a need for access barring techniques that are directed towards network slicing.

SUMMARY

Some exemplary embodiments are related to a method performed by a user equipment (UE). The method include collecting information to perform an access barring procedure corresponding to a cell of a network, performing an accessing barring procedure using the information, performing a random access channel (RACH) procedure with the cell and establishing a radio resource control (RRC) connection with the cell.

Other exemplary embodiments are related to a user equipment having a transceiver and a processor. The transceiver is configured to communicate with a network. The processor configured to perform operations. The operations include comprising collecting information to perform an access barring procedure corresponding to a cell of a network, performing an accessing barring check procedure using the information, performing a random access channel (RACH) procedure with the cell and establishing a radio resource control (RRC) connection with the cell.

Still further exemplary embodiments are related to a baseband processor that performs operations. The operations include collecting information to perform an access barring procedure corresponding to a cell of a network, performing an accessing barring check procedure using the information, performing a random access channel (RACH) procedure with the cell and establishing a radio resource control (RRC) connection with the cell.

BRIEF DESCRIPTION OF THE DRAWINGS

FIG. 4 shows an example of standardized access categories arranged by access category number.

FIG. 5 shows an example of standardizes access identities arranged by access identity number.

DETAILED DESCRIPTION

Figure 1:
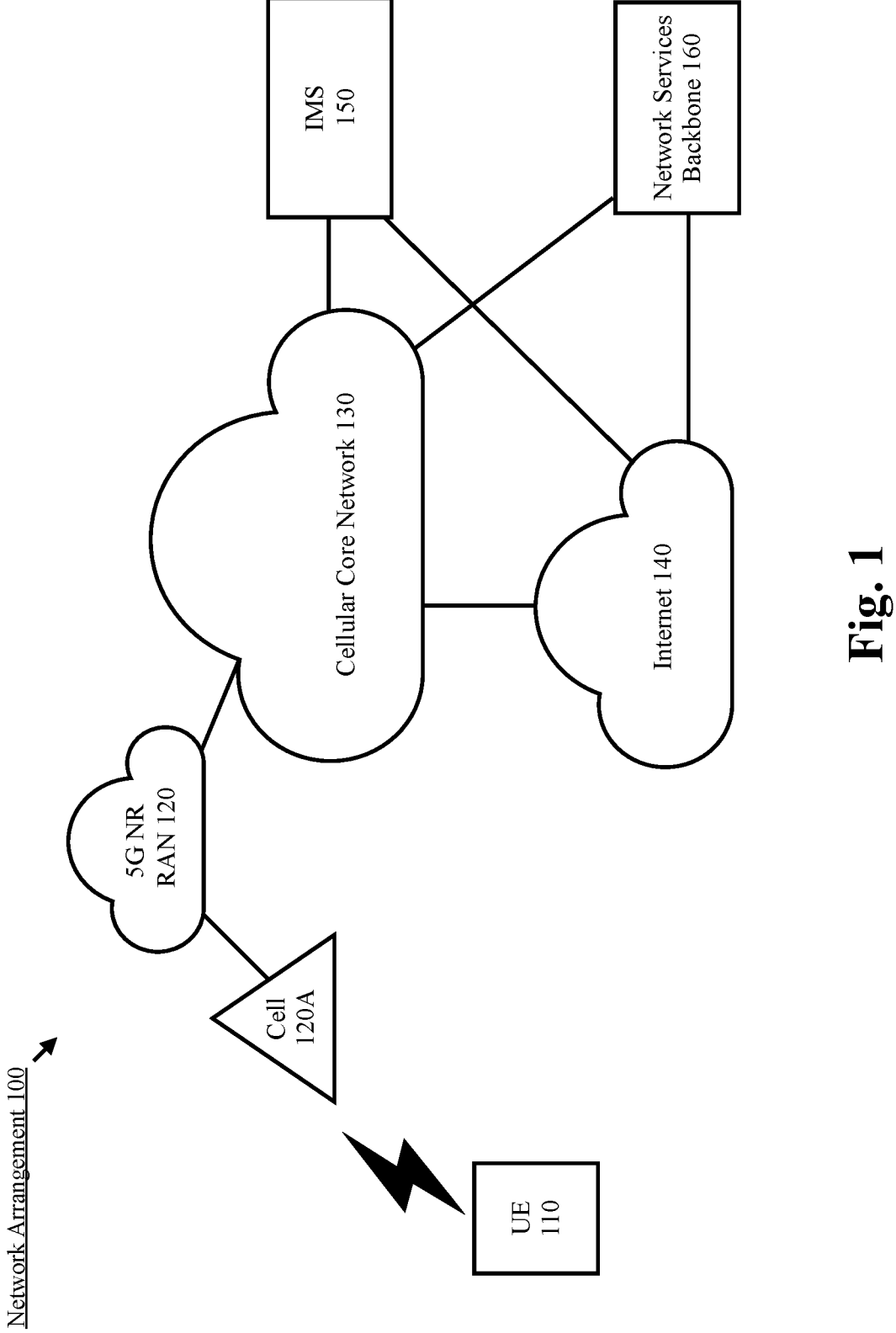
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to implementing various access barring techniques related to network slicing.

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any electronic component.

The exemplary embodiments are also described with regard to a fifth generation (5G) network that includes network slicing. Generally, network slicing refers to a network architecture in which multiple end-to-end logical networks run on a shared physical network infrastructure. Each network slice may be configured to provide a particular set of capabilities and/or characteristics. Thus, the physical infrastructure of the 5G network may be sliced into multiple virtual networks, each configured for a different purpose.

Those skilled in the art will understand that 5G may support use cases such as enhanced mobile broadband (eMBB), enhanced machine type communication (eMTC) and industrial internet of things (IIoT). Each of these types of use cases may relate to various different types of applications and/or services. A network slice may be characterized by a type of use case, a type of application and/or service or the entity that provides the application and/or service via the network slice. However, any example in this description that characterizes a network slice in a specific manner is only provided for illustrative purposes. Throughout this description, reference to a network slice may represent any type of end-to-end logical network that is configured to serve a particular purpose and implemented on the 5G physical infrastructure.

The UE may be configured to perform any of a wide variety of different tasks. Thus, the UE may be configured to utilize one or more network slices. For example, the UE may utilize a first network slice for carrier services (e.g., voice, multimedia messaging service (MMS), Internet, etc.) and another network slice for a service provided by a third-party. To provide an example, the third-party may be the manufacturer of the UE that provides services such as, but not limited to, messaging, streaming multimedia, video calls, etc. In another example, the third-party may be an entity managing a digital platform (e.g., social media, e-commerce, streaming media, etc.). In a further example, the third-party may be an entity providing services for Internet of Things (IoT) devices.

As indicated above, a network slice may serve a wide variety of different purposes. However, the configured purpose of a network slice is beyond the scope of the exemplary embodiments. Thus, the exemplary embodiments are not limited to any particular type of network slice. Instead, the exemplary embodiments relate to the UE accessing a particular network slice via a radio access network (RAN).

A network slice may be identified by single network slice selection assistance information (S-NSSAI). Each instance of S-NSSAI may be associated with a public land mobile network (PLMN) and may include the slice service type (SST) and a slice descriptor (SD). The SST may identify the expected behavior of the corresponding network slice with regard to services, features and characteristics. Those skilled in the art will understand that the SST may be associated with a standardized SST value. The SD may identify any one or more entities associated with the network slice. For example, the SD may indicate an owner or an entity that manages the network slice (e.g., carrier) and/or the entity that is providing the application/service via the network slice (e.g., a third-party, an entity that provides the application or service, etc.). In some embodiments, the same entity may own the slice and provide the service (e.g., carrier services). Throughout this description, S-NSSAI refers to a single network slice and NSSAI may generally refer to one or more network slices.

The UE may camp on a cell of a 5G NR RAN to access a network slice. In a first aspect, the exemplary embodiments include UE based access barring techniques related to network slicing. The UE based access barring techniques may be performed by the UE prior to the UE initiating a synchronization procedure with the cell. In a second aspect, the exemplary embodiments include random access channel (RACH) access barring techniques related to network slicing. In a third aspect, the exemplary embodiments relate to radio resource control (RRC) based access barring techniques related to network slicing. Specific examples of these exemplary access barring techniques will be described in detail below. The exemplary access barring techniques described herein may be used in conjunction with other access barring techniques, future implementations of access barring techniques and independently from other access barring techniques.

FIG. 1 shows an exemplary network arrangement 100 according to various exemplary embodiments. The network arrangement 100 include a UE 110. Those skilled in the art will understand that the UE 110 may be any type of electronic component that is configured to communicate via a network, e.g., mobile phones, tablet computers, desktop computers, smartphones, phablets, embedded devices, wearables, IoT devices, eMTC devices, IIoT devices, MBB devices, etc. It should also be understood that an actual network arrangement may include any number of UEs being used by any number of users. Thus, the example of a single UE 110 is merely provided for illustrative purposes.

The UE 110 may be configured to communicate with one or more networks. In this example, the network with which the UE 110 may wirelessly communicate is a 5G NR radio access network (RAN) 120. However, it should be understood that the UE 110 may also communicate with other types of networks (e.g. 5G cloud RAN, an LTE RAN, a legacy cellular network, a WLAN, etc.) and the UE 110 may also communicate with networks over a wired connection. With regard to the exemplary embodiments, the UE 110 may establish a connection with the 5G NR RAN 120. Therefore, the UE 110 may have a 5G NR chipset to communicate with the NR RAN 120.

The 5G NR RAN 120 may be a portion of a cellular network that may be deployed by a network carrier (e.g., Verizon, AT&T, Sprint, T-Mobile, etc.). The 5G NR RAN 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

In network arrangement 100, the 5G NR RAN 120 includes a cell 120A that represents a gNB. However, an actual network arrangement may include any number of different types of cells being deployed by any number of RANs. Thus, the example of a single cell 120A is merely provided for illustrative purposes.

The cell 120A may include one or more communication interfaces to exchange data and/or information with UEs, the corresponding RAN, the cellular core network 130, the internet 140, etc. Further, the cell 120A may include a processor configured to perform various operations. For example, the processor of the cell 120A may be configured to perform operations related to access barring. However, reference to a processor is merely for illustrative purposes. The operations of the cell 120A may also be represented as a separate incorporated component of the cell 120A or may be a modular component coupled to the cell 120A, e.g., an integrated circuit with or without firmware. For example, the integrated circuit may include input circuitry to receive signals and processing circuitry to process the signals and other information. In addition, in some examples, the functionality of the processor is split among two or more processors such as a baseband processor and an applications processor. The exemplary embodiments may be implemented in any of these or other configurations of a cell.

The UE 110 may connect to the 5G NR-RAN 120 via the cell 120A. Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific cell (e.g., the cell 120A). However, as mentioned above, reference to the 5G NR-RAN 120 is merely for illustrative purposes and any appropriate type of RAN may be used.

In addition to the 5G NR RAN 120, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
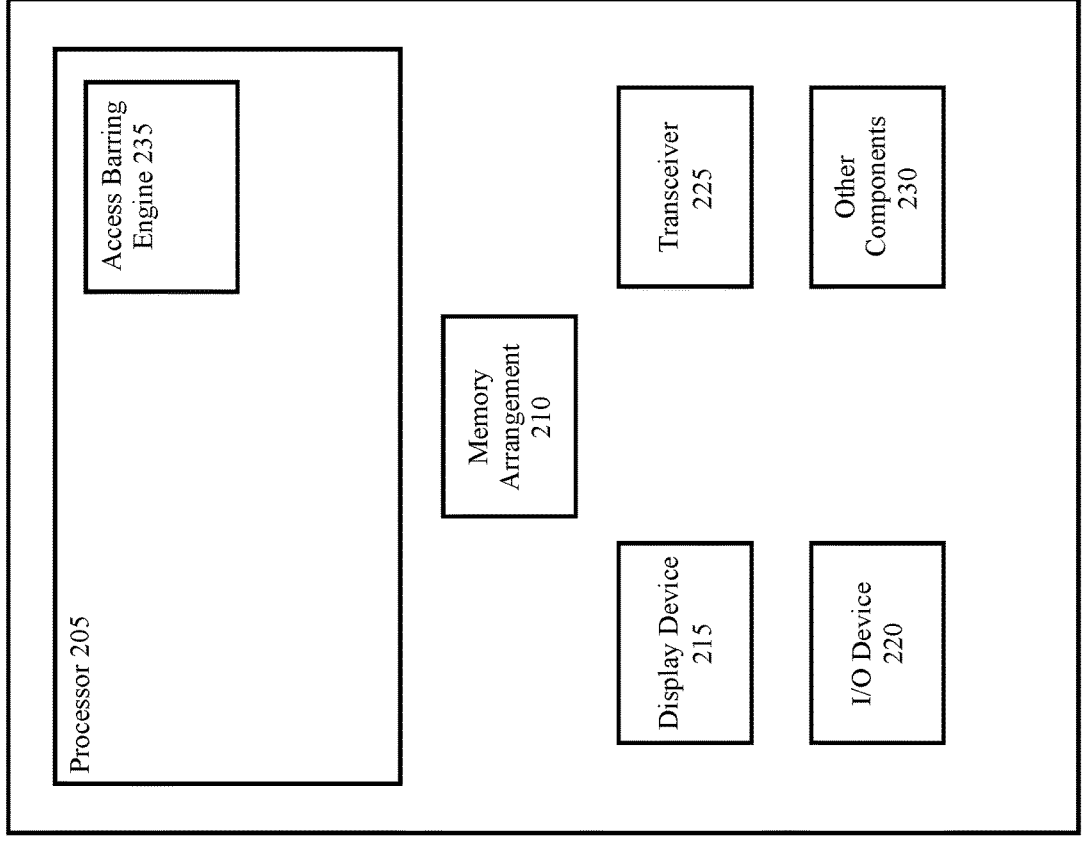
FIG. 2 shows an exemplary UE according to various exemplary embodiments.
Figure 2:

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225 and other components 230. The other components 230 may include, for example, an audio input device, an audio output device, a power supply, a data acquisition device, ports to electrically connect the UE 110 to other electronic devices, etc.

The processor 205 may be configured to execute a plurality of engines of the UE 110. For example, the engines may include an access barring engine 235. The access barring engine 235 may perform operations related to determining whether access to a cell and/or network slice is permitted.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, an LTE-RAN (not pictured), a legacy RAN (not pictured), a WLAN (not pictured), etc. Accordingly, the transceiver 225 may operate on a variety of different frequencies or channels (e.g., set of consecutive frequencies).

Figure 3:
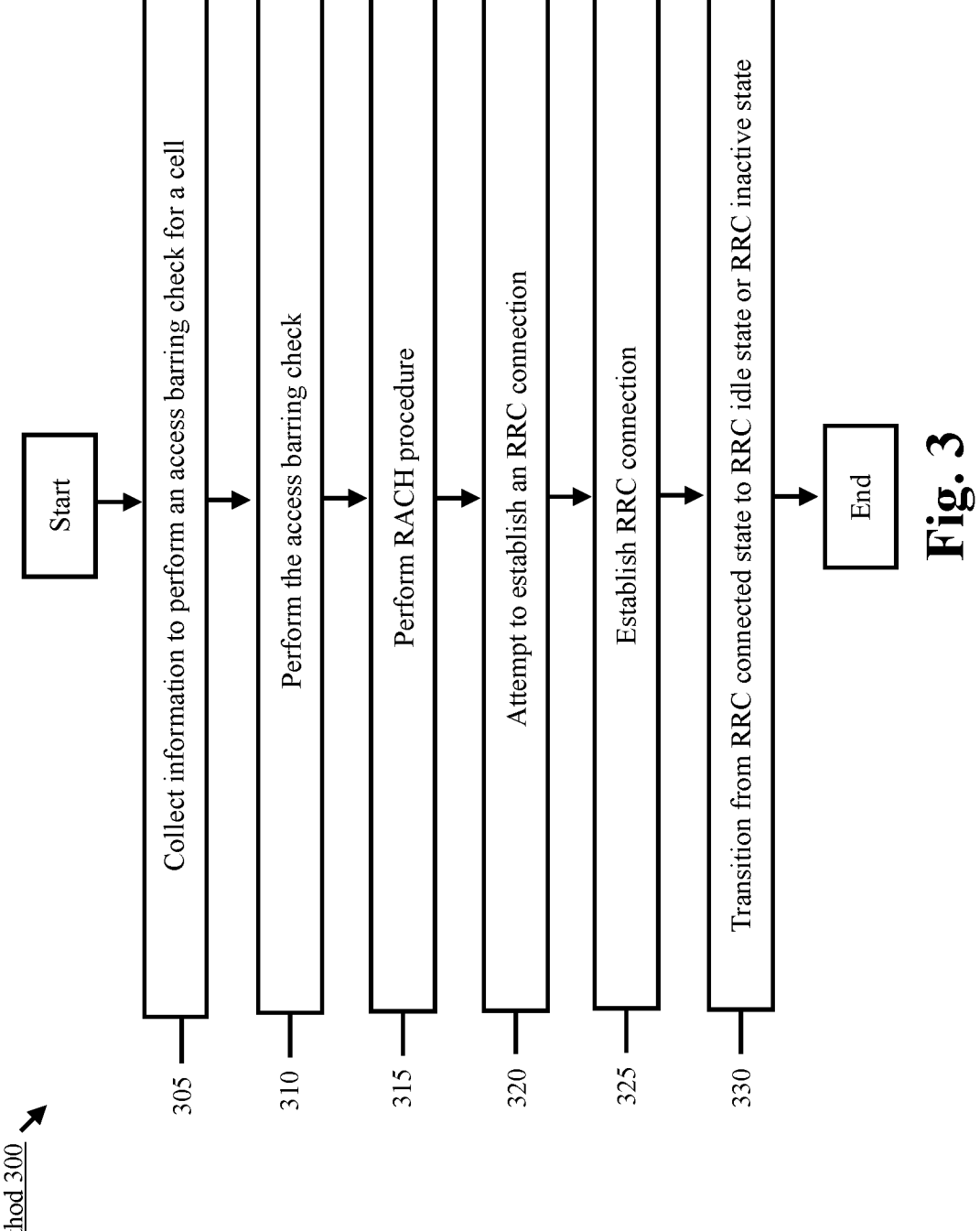
FIG. 3 shows a method for implementing various access barring techniques related to network slicing according to various exemplary embodiments.

FIG. 3 shows a method 300 for implementing various access barring techniques related to network slicing according to various exemplary embodiments. The method 300 will be described with regard to the network arrangement 100 of FIG. 1 and the UE 110 of FIG. 2.

The method 300 references several procedures that may be configured to include one or more exemplary accessing barring techniques. The method 300 will be described from the perspective of the UE 110. However, the method 300 includes both UE 110 and network mechanisms for implementing access barring techniques that are related to network slicing.

As will be described in more detail below, one or more exemplary techniques may be incorporated into unified access control (UAC). Those skilled in the art will understand that UAC is a UE 110 based access barring mechanism. UAC may occur prior to a RACH procedure. Those skilled in the art will understand that the RACH procedure may be used for synchronizing the UE 110 and a currently camped cell (e.g., cell 120A). One or more exemplary access barring techniques may be incorporated into the RACH procedure.

In addition, the one or more exemplary access barring techniques may be incorporated into different aspects of radio resource control (RRC). Those skilled in the art will understand that RRC relates to establishing and maintaining a radio link with a cell of the network. Thus, the exemplary embodiments relate to implementing various access barring techniques related to network slicing prior to the UE 110 initiating a synchronization procedure, during a synchronization procedure, during RRC connection establishment and/or while the UE 110 is camped on the cell and operating in an RRC idle state or inactive state. Specific examples of these various access barring techniques are provided below.

In 305, the UE 110 collects information to perform an access barring procedure for a target cell (e.g., cell 120A). Those skilled in the art will understand that an access barring procedure may be triggered when the UE 110 wants to transition to the RRC connected state or in response to any other appropriate type of predetermined condition.

One exemplary access barring technique related to network slicing includes configuring UAC parameters for network slicing. For example, UAC is configured on a per access category basis. FIG. 4 shows an example of standardized access categorizes arranged by access category number. In some exemplary embodiments, one or more reserved bits (e.g., access category numbers 9-31) may be configured for a particular type of service. For example, one or more of the reserved bits may be configured for MBB services. In another example, one or more of the reserved bits may be configured for eMTC service. In a further example, one or more reserved bits may be configured for IIoT services. However, the above examples are merely provided for illustrative purposes. The exemplary embodiments may apply to any type of network slice characterized in any appropriate manner being assigned an access category bit or number.

Accordingly, collecting information to perform an access barring procedure may include retrieving an indication of an access category associated with the UE 110. This indication may be stored in the SIM of the UE 110 or in any other appropriate location. In addition, collecting information to perform an access barring procedure may include receiving information from the network indicating the one or more access categories supported by the target cell. The UE 110 may also determine the types of access categories supported by the target cell based on transmissions from the cell, e.g., a master information block (MIB), a system information block (SIB), a previous instance of RRC signaling or any other appropriate basis.

An access identity is another UAC parameter that may be configured for network slicing. FIG. 5 shows an example of standardized access identities arranged by access identity number. In some exemplary embodiments, the reserved bits (e.g., 3-10) may be assigned to different network slices or types of network slices.

Accordingly, collecting information to perform an access barring procedure may include retrieving an indication of an access identity associated with the UE 110. This indication may be stored in the SIM or in any other appropriate location. In addition, collecting information to perform an access barring procedure may include receiving information from the network indicating one or more access identities supported by the target cell. The UE 110 may determine the types of access categories supported by the target cell based on a master information block (MIB), a system information block (SIB), a previous instance of RRC signaling or any other appropriate basis.

In some embodiments, the target cell may broadcast information (e.g., UAC-barringinfo in SIB1) that indicates which NSSAI(s) are or are not accessible via the cell. Accordingly, collecting information to perform an access barring procedure may include retrieving an indication of the s-NSSAI/NSSAI that are or are not accessible via the cell.

In 310, the UE 110 may perform the accessing barring check. For example, the UE 110 may determine whether the UE 110 and the target cell are associated with the same access identity. In another example, the UE 110 may determine whether the UE 110 and the target cell are associated with the same access identity. In a further example, the UE 110 may determine whether a particular s-NSSAI or NSSAI that the UE 110 intends to access is supported by the target cell.

In this example, it may be considered that the access barring procedure is successful. Thus, the UE 110 may perform a RACH procedure in 315. However, if the access barring procedure indicates that an access identify associated with the UE 110 is barred, an access category associated with the UE 110 is barred and/or a particular s-NSSAI or NSSAI that the UE 110 intends to access is not supported by the target cell, the access check may be unsuccessful. In this type of scenario, the UE 110 may search for a different target cell to camp on.

In 315, the UE 110 and the target cell may participate in a RACH procedure. As will be described below, there may be multiple exemplary access barring techniques related to network slicing incorporated into the RACH procedure.

Those skilled in the art will understand that a network slice may include a radio access network (RAN) slice and a core network slice. One exemplary access barring technique related to network slicing includes physical random access channel (PRACH) resource partitioning based on a RAN slice. For example, to access a first RAN slice via the cell, a first set of PRACH resource may be used for the transmission of the PRACH preamble. To access a second RAN slice via the cell, a second different set of PRACH resources may be used for the transmission of the PRACH preamble. Thus, separate and distinct PRACH resources may be used for access to different RAN slices on the same cell.

Similarly, to access a first RAN slice via the cell, a first PRACH preamble sequence may be utilized during the RACH procedure. To access a second RAN slice, a second different PRACH preamble sequence may be utilized during the RACH procedure. Thus, separate and distinct PRACH preamble sequences may be used for access to different RAN slices on the same cell.

Another exemplary access barring technique related to network slicing includes utilizing different RACH back off timers or back off indicators (BIs) for different RAN slices. Those skilled in the art will understand that these timing mechanisms may be used to indicate when a subsequent random access request should be transmitting. Further, since resource partitioning is based on a RAN slice, these timing mechanisms may be used to avoid collisions between random access requests associated with different RAN slices.

For example, based on the PRACH resource selected by the UE 110 to transmit the PRACH preamble, the cell may identify which network slice the UE 110 intends to access. Thus, the cell may select the back off timer parameters for the corresponding RAN slice and indicate the back off timer parameters to the UE 110 in the random access response (RAR). If a subsequent random access request is needed, the UE 110 may transmit the subsequent random access request in accordance with the back off timer parameters (e.g., expiration of the timer, a threshold value is satisfied, etc.).

In other embodiments, a BI scaling factor may be implemented for each PRACH resource set. For example, based on the PRACH resource selected by the UE 110 to transmit the PRACH preamble, the cell may identify which network slice the UE 110 intends to access. Thus, the cell may select the corresponding BI scaling factor for the corresponding RAN slice and indicate the BI scaling factor to the UE 110 in the RAR. If a subsequent random access request is needed, the UE 110 may transmit the subsequent random access request in accordance with a timing parameter derived from the BI scaling factor.

In addition, the PRACH configuration parameters defined in RACH-configCommon may be configured per RAN slicing. These parameters may include, but are not limited to, a PRACH resource, a total number of preambles in the RACH resources, extra groups of message 3 (MSG3) to accommodate different size MSG3s, a re-contention resolution timer, power ramping step, random access response window, etc. Thus, a first RAN slice may correspond to a first set of RACH configuration parameters and a second network slice may correspond to its own distinct set of RACH configuration parameters.

In this example, it may be considered that the RACH procedure is successful. Thus, the UE 110 may attempt to establish an RRC connection in 320. However, if the RACH procedure fails, the UE 110 may reattempt the RACH procedure or search for a different cell to camp on.

Another exemplary access barring technique related to network slicing corresponds to an RRC reject or an RRC release message. In the following example, reference will be made to the RRC reject message. However, the exemplary concepts described herein that are applicable to the RRC reject message may also applicable to an RRC release message.

In the RRC reject message, the wait timer may be configured based on RAN slicing ID and/or a cause value. In some embodiments, the network may indicate a type of operation that the UE 110 may perform in response to receiving the RRC reject message in SIB or for different RAN slices. For example, the network may indicate that the UE 110 is to try to establish an RRC connection after the wait timer expires. In another example, the network may indicate that the UE 110 is to try and find another cell to camp on.

Alternatively, the network may configure a common value for the wait timer and a slice specific factor in SIB or the RRC reject message. The UE 110 may then apply the factor to scale the timer value.

In this type of scenario, the network may determine which network slice the UE 110 intends to utilize based on the RACH procedure. In other embodiments, the UE 110 may indicate the RAN slicing ID in the corresponding RRC request message or RRC resume request message.

In this example, the UE 110 successfully establishes an RRC connection with the cell procedure. Thus, in 325, the UE 110 and the cell establish an RRC connection.

Another exemplary access barring technique related to network slicing corresponds to timers and constants applicable for RRC idle state or RRC inactive state. These timers and constants may be configured separately for different RAN slices. For example, the UE 110 may have previously received a SIB that explicitly configures one or more timers and/or one or more counters for each RAN slice. In another example, the network may provide the common value for the timers and counters and then provide slice specific factors. The UE 110 may apply the slice specific factors to the common values to derive the values for the corresponding timers and/or counts.

In 330, the RRC transitions from the RRC connected state to an RRC idle state or an RRC inactive in accordance with an applicable timer or counter.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method, performed by a user equipment (UE), the method comprising:
  collecting information to perform an access barring procedure corresponding to a cell of a network, wherein the information includes a physical random access channel (PRACH) resource set specific to a radio access network (RAN) slice;
  performing an accessing barring procedure using the information;
  performing a random access channel (RACH) procedure with the cell using the PRACH resource set, wherein the RACH procedure includes receiving a backoff indication (BI) scaling factor specific to the PRACH resource set; and
  establishing a radio resource control (RRC) connection with the cell.

2. The method of claim 1, wherein the information further includes one of i) an access category number associated with the UE and a network slice and ii) an access identity associated with the UE and the network slice.

3. The method of claim 1, wherein the information further includes an indication of network slice selection assistance information (NSSAI), the NSSAI associated with unified access control (UAC) barring information broadcast by the cell.

4. The method of claim 1, wherein performing the access barring procedure includes determining whether the UE and the cell are associated with a same access category number, the access category number corresponding to a network slice.

5. The method of claim 1, wherein performing the access barring procedure includes determining whether the UE and the cell are associated with a same access identity number, the access identity number corresponding to a network slice.

6. The method of claim 1, wherein performing the RACH procedure includes transmitting on a physical random access channel (PRACH) resource set specific to the RAN slice.

7. The method of claim 1, wherein performing the RACH procedure includes receiving RACH configuration related parameters configured for the RAN slice.

8. The method of claim 1, further comprising:
  receiving a radio resource control (RRC) message that includes an indication of a wait timer parameter, the wait timer configured based on a radio access network (RAN) slicing ID.

9. The method of claim 8, further comprising:
  receiving a radio resource control (RRC) message that includes an indication of a wait timer parameter, the wait timer configured based on a common value and a slice specific factor.

10. The method of claim 1, further comprising:
  receiving a timer parameter associated with i) a radio access network (RAN) slice and ii) a radio resource control (RRC) idle state or RRC inactive state.

11. A user equipment (UE), comprising:
  a transceiver configured to communicate with a network; and
  a processor configured to perform operations comprising:
    collecting information to perform an access barring procedure corresponding to a cell of a network, wherein the information includes a physical random access channel (PRACH) resource set specific to a radio access network (RAN) slice;
    performing an accessing barring check procedure using the information;
    performing a random access channel (RACH) procedure with the cell using the PRACH resource set, wherein the RACH procedure includes receiving a backoff indication (BI) scaling factor specific to the PRACH resource set; and
    establishing a radio resource control (RRC) connection with the cell.

12. The UE of claim 11, wherein the information further includes one of i) an access category number associated with the UE and a network slice and ii) an access identity associated with the UE and a network slice.

13. The UE of claim 11, wherein the information further includes an indication of network slice selection assistance information (NSSAI), the NSSAI associated with unified access control (UAC) barring information broadcast by the cell.

14. The UE of claim 11, wherein performing the RACH procedure includes transmitting on a physical random access channel (PRACH) resource set specific to the RAN slice.

15. A baseband processor configured to perform operations, comprising:
  collecting information to perform an access barring procedure corresponding to a cell of a network, wherein the information includes a physical random access channel (PRACH) resource set specific to a radio access network (RAN) slice;
  performing an accessing barring check procedure using the information;
  performing a random access channel (RACH) procedure with the cell using the resource set, wherein the RACH procedure includes receiving a backoff indication (BI) scaling factor specific to the PRACH resource set; and
  establishing a radio resource control (RRC) connection with the cell.

16. The baseband processor of claim 15, wherein the information further includes one of i) an access category number associated with a user equipment (UE) and a network slice and ii) an access identity associated with the UE and a network slice.

17. The baseband processor of claim 15, wherein the information further includes an indication of network slice selection assistance information (NSSAI), the NSSAI associated with unified access control (UAC) barring information broadcast by the cell.

18. The baseband processor of claim 15, wherein performing the RACH procedure includes transmitting a physical random access channel (PRACH) preamble sequence specific to the RAN slice.

\* \* \* \* \*